United States Patent
Yokoyama et al.

[11] Patent Number: 5,436,727
[45] Date of Patent: Jul. 25, 1995

[54] DISTANCE MEASURING METHOD AND APPARATUS

[75] Inventors: Atsushi Yokoyama, Kanagawa; Takayuki Yoshigahara, Tokyo, both of Japan

[73] Assignee: Sony Corporation, Japan

[21] Appl. No.: 203,567

[22] Filed: Mar. 1, 1994

[30] Foreign Application Priority Data

Mar. 8, 1993 [JP] Japan ............................ 5-072926

[51] Int. Cl.$^6$ .............................................. G01B 11/24
[52] U.S. Cl. .................................. 356/376; 250/559.24
[58] Field of Search ................ 356/375, 376, 1, 372, 356/4, 377, 394; 250/560, 561; 348/94

[56] References Cited

U.S. PATENT DOCUMENTS

| | | | |
|---|---|---|---|
| 4,158,507 | 6/1979 | Himmel | 356/376 |
| 4,325,639 | 4/1982 | Richter | 356/376 |
| 4,794,262 | 12/1988 | Sato et al. | 356/376 |
| 4,936,676 | 6/1990 | Stauffer | 356/375 |
| 4,982,102 | 1/1991 | Inoue et al. | 356/376 |
| 4,993,835 | 2/1991 | Inoue et al. | 356/376 |
| 5,022,751 | 6/1991 | Howard | 356/1 |

FOREIGN PATENT DOCUMENTS

0003212  1/1988  Japan ................................ 356/376

Primary Examiner—Hoa Q. Pham
Attorney, Agent, or Firm—Ronald P. Kananen

[57] ABSTRACT

A distance measuring method and apparatus capable of achieving fast and precise measurement of distances to positions on the surface of a three-dimensional object. The measuring procedure comprises the steps of: calculating count values $C_1$ and $C_2$ indicative respectively of angle differences $\theta_1$ and $\theta_2$ of a scanning mirror where slit light reflected from a reference plane set at first, second and third positions S0, S1 and S2 is incident upon a predetermined one of sensing cells arranged on an image pickup plane; calculating a count value $C_x$ indicative of an angle difference between an angle $\theta_{S2}$ of the scanning mirror where the slit light reflected from the reference plane at the third position thereof is incident upon the said cell on the image pickup plane, and another angle $\theta_{SX}$ of the scanning mirror where the slit light reflected from the surface of the object is incident upon the said cell on the image pickup plane; and executing a predetermined calculation to obtain the distance between the first position S0 and the object surface.

9 Claims, 9 Drawing Sheets

DISTANCE MEASURING METHOD AND APPARATUS

BACKGROUND OF THE INVENTION

1. Field of the Invention

The present invention relates to a method and an apparatus for measuring a distance and, more particularly, for measuring the external shape of a three-dimensional object.

2. Description of the Related Art

According to one of the distance measuring methods known heretofore, positions on the surface of a three-dimensional object are measured by scanning the surface with a beam of slit light while rotating a scanning mirror, and detecting the points in time when the slit light reflected from the object surface passes through sensing cells arranged on an image pickup plane.

Figure 11:
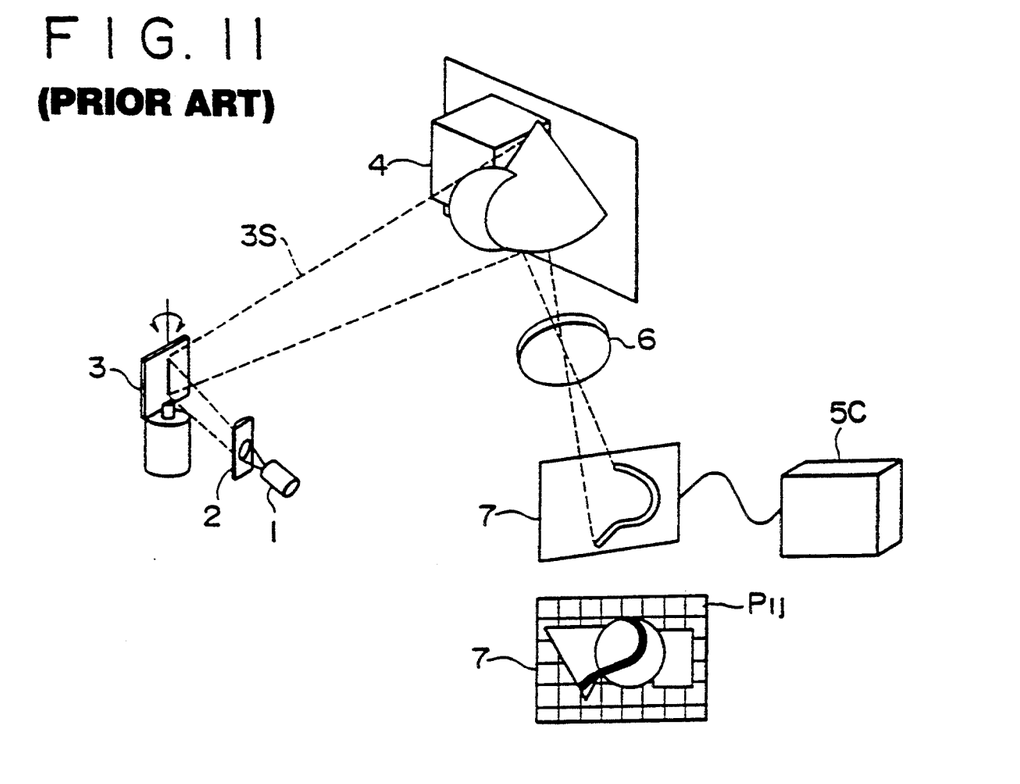
FIG. 11 is a perspective view of a conventional distance measuring apparatus known in the prior art.

FIG. 11 shows an exemplary conventional apparatus which carries out such distance measuring method. In this example, an infrared or similar laser beam emitted from a laser light source 1 is formed into slit light via an optical device 2. The slit laser light is then reflected by a scanning mirror 3 consisting of a galvano mirror or the like disposed at a predetermined position. The slit light 3S thus reflected from the scanning mirror 3 scans the surface of a three-dimensional object 4, which is to be measured, with rotation of the mirror 3.

The slit light reflected from the object 4 is focused on an image pickup plane 7 via an optical device 6. In a controller 5C comprising a differentiator, an integrator and other components, the rotational position of the scanning mirror 3 is detected by finding the point in time when the slit light reflected from the object 4 passes through each of the image sensing cells, i.e., light receiving cells $P_{i,j}$ arranged two-dimensionally on the image pickup plane 7. The distance up to the object 4 is measured trigonometrically per sensing cell $P_{i,j}$ on the image pickup plane 7 from the positional relationship among the rotational position of the scanning mirror 3, the image pickup plane 7 and the scanning mirror 3.

Figure 12:
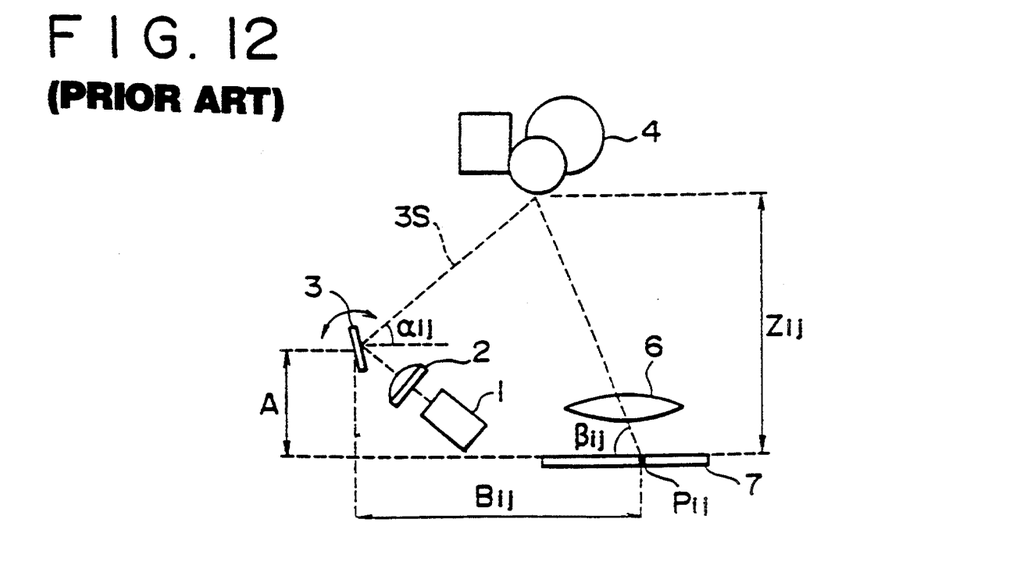
FIG. 12 is a schematic diagram for explaining the method of triangulation employed in the conventional apparatus of FIG. 1.

FIG. 12 schematically shows the principle of measuring three-dimensional coordinate positions on the surface of the object 4 according to the method of triangulation. The distance $Z_{i,j}$ from the image pickup plane 7 to one surface position on the object 4 whose reflected slit light is focused on the sensing cell $P_{i,j}$ of the image pickup plane 7 can be obtained trigonometrically from Eq. (1) by using the distance $B_{i,j}$ between the focused position on the image pickup plane 7 and the rotational center of the scanning mirror 3, the angle $\alpha_{i,j}$ formed by the image pickup plane 7 and the slit light reflected 3S from the mirror 3, the angle $\beta_{i,j}$ at which the slit light is incident upon the image pickup plane 7 from the object 4, and the vertical distance A from the rotational center of the scanning mirror 3 to an extension of the image pickup plane 7.

$$Z_{i,j} = \frac{\tan\alpha_{i,j}\tan\beta_{i,j}}{\tan\alpha_{i,j} + \tan\beta_{i,j}}\left(B_{i,j} + \frac{A}{\tan\alpha_{i,j}}\right) \quad \text{EQ. (1)}$$

The three parameters $B_{i,j}$, $\beta_{i,j}$ and A in Eq. (1) are constants determined uniquely by the arrangement of the light source 1, the optical device 2, the scanning mirror 3, the optical device 6 and the image pickup plane 7. The angle $\alpha_{i,j}$ formed by the image pickup plane 7 and the slit light reflected 3S from the scanning mirror 3 can be obtained by, as mentioned, detecting the rotational position of the mirror 3 from the point in time when the slit light reflected from the object 4 passes through the sensing cell $P_{i,j}$ on the image pickup plane 7. Therefore it is possible to trigonometrically calculate the distance $Z_{i,j}$ from each cell on the image pickup plane 7 to the object 4.

However, the following problems exist in the conventional distance measuring method and apparatus mentioned above.

(1) Difficulties in deriving parameters

For accurately finding the distance $Z_{i,j}$ up to the object 4, it is necessary to derive the four parameters $B_{i,j}$, $\beta_{i,j}$, A and $\alpha_{i,j}$ with high precision. However, since the parameter $\alpha_{i,j}$ represents the angle formed by a plane parallel with the image pickup plane 7 and the slit light reflected from the scanning mirror 3, it is difficult to derive the parameter $\alpha_{i,j}$ with high precision even by accurately finding the point in time when the slit light reflected from the object 4 passes through the sensing cell $P_{i,j}$ on the image pickup plane 7. Extremely great difficulties are also unavoidable in measuring the parameters $B_{i,j}$, $\beta_{i,j}$ and A with high precision.

(2) Difficulties in deriving distance from angle data

Even if the four parameters $B_{i,j}$, $\beta_{i,j}$, A and $\alpha_{i,j}$ can be obtained precisely, a long time is required for measuring one distance image because a considerably long time is needed to execute the calculation of Eq. (1) for every one of the sensing cells $P_{i,j}$ on the image pickup plane 7.

SUMMARY OF THE INVENTION

The present invention has been accomplished in view of the circumstances described above. An object of the invention is to provide an improved distance measuring method and apparatus capable of performing accurate and fast measurements of positions on the surface of a three-dimensional object.

According to a first aspect of the present invention, a distance measuring method scans the surface of an object with slit light while rotating a scanning mirror (e.g., mirror 3 in FIG. 1), and then detects the points in time when the slit light reflected from the object passes through sensing cells (e.g., cells $P_{i,j}$ in FIG. 1) arranged on an image pickup plane (e.g., plane 7 in FIG. 1), thereby measuring the positions on the surface of the object. This method comprises the steps of: calculating a numerical value (e.g., count value $C_1$ in an undermentioned embodiment) indicative of a first angle difference (e.g., angle $\theta_1$ in FIG. 2) between a first angle (e.g., angle $\theta_{S0}$ in FIG. 1) of the scanning mirror, where slit light reflected from a reference plane at a first position (e.g., position S0 in FIG. 1) is incident upon a predetermined one of the sensing cells arranged on the image pickup plane, and a second angle (e.g., angle $\theta_{S1}$ in FIG. 1) of the scanning mirror, where slit light reflected from the reference plane at a second position (e.g., position S1 in FIG. 1) is incident upon the sensing cell on the image pickup plane, the second position of the reference plane being spaced apart by a predetermined distance (e.g., d in FIG. 1) from the first position; calculating a numerical value (e.g., count value $C_2$ in the embodiment) indicative of a second angle difference (e.g., angle $\theta_2$ in FIG. 2) between the second angle (e.g., $\theta_{S1}$ in FIG. 1) of the scanning mirror, and a third angle (e.g., angle $\theta_{S2}$ in FIG. 1) of the scanning mirror, where slit light reflected from the reference plane at a third position (e.g., position S2 in FIG. 1) is incident upon the sensing cell on the image pickup plane, the third position of the reference plane being spaced apart from the second position by the same predetermined distance; calculating a numerical value (e.g., count value $C_x$ in the embodiment) indicative of a third angle difference (e.g., angle $\theta_x$ in FIG. 2) between the third angle (e.g., angle $\theta_{S2}$ in FIG. 1) of the scanning mirror and a fourth angle of the scanning mirror where slit light reflected from the surface of the object to be measured is incident upon the sensing cell on the image pickup plane; and calculating the distance between the object and the first position on the basis of the three numerical values indicative of the first, second and third angle differences.

According to a second aspect of the invention, there is provided a distance measuring method which scans the surface of an object with slit light while rotating a scanning mirror, and then detects the points in time when the slit light reflected from the object passes through sensing cells arranged on an image pickup plane, thereby measuring the positions on the surface of the object. This method comprises the steps of: calculating a count value $C_1$ indicative of a first angle difference between a first angle of the scanning mirror, where slit light reflected from a reference plane at a first position is incident upon a predetermined one out of a plurality of sensing cells arranged on an image pickup plane, and a second angle of the scanning mirror, where slit light reflected from the reference plane at a second position is incident upon the one sensing cell on the image pickup plane, the second position of the reference plane being spaced apart from the first position by a predetermined distance; calculating a count value $C_2$ indicative of a second angle difference between the second angle of the scanning mirror and a third angle of the scanning mirror, where slit light reflected from the reference plane at a third position is incident upon the one sensing cell on the image pickup plane, the third position of the reference plane being spaced apart by the same predetermined distance from the second position; calculating a count value $C_x$ indicative of a third angle difference between the third angle of the scanning mirror and a fourth angle of the scanning mirror, where slit light reflected from the surface of the object to be measured is incident upon the one sensing cell on the image pickup plane; calculating a parameter k representing the relationship between the rotational angle of the scanning mirror and the count value; and calculating the distance x from the first position to the object by Eq. (2) given below:

$$x = \frac{2d\tan(kC_2)(\tan(kC_1 + kC_2) - \tan(kC_x))}{\tan(kC_x)\tan(kC_1 + kC_2) - 2\tan(kC_x)\tan(kC_2) + \tan(kC_2)\tan(kC_1 + kC_2)} \quad \text{EQ. (2)}$$

According to a third aspect of the invention, a distance measuring apparatus scans the surface of an object with slit light while rotating a scanning mirror, and then detects the points in time when the slit light reflected from the object passes through sensing cells arranged on an image pickup plane, thereby measuring the positions on the surface of the object. This apparatus comprises a counter (e.g., counter 12 in FIGS. 3 and 4) for outputting a count value indicative of the rotational angle of the scanning mirror; a first subtracter (e.g., subtracter 142A in FIG. 4) for calculating the difference between the output count value of the counter indicative of the first angle of the scanning mirror, where slit light reflected from a reference plane at a first position is incident upon a predetermined one out of a plurality of sensing cells arranged on the image pickup plane, and the output count value of the counter indicative of a second angle of the scanning mirror, where slit light reflected from the reference plane at a second position is incident upon the one sensing cell on the image pickup plane, the second position of the reference plane being spaced apart from the first position by a predetermined distance; a second subtracter (e.g., subtracter 142B in FIG. 4) for calculating the difference between the output count value of the counter indicative of the second angle of the scanning mirror and the output count value of the counter indicative of a third angle of the scanning mirror, where slit light reflected from the reference plane at a third position is incident upon the one sensing cell on the image pickup plane, the third position of the reference plane being spaced apart from the second position by the same predetermined distance; a third subtracter (e.g., subtracter 142C in FIG. 4) for calculating the difference between the output count value of the counter indicative of the third angle of the scanning mirror and the output count value of the counter indicative of a fourth angle of the scanning mirror, where slit light reflected from the surface of the object to be measured is incident upon the one sensing cell on the image pickup plane; and a calculator (e.g., calculator 143 in FIG. 4) for calculating the distance between the object and the first position on the basis of the outputs of the first, second, and third subtracters and the parameters representing the relationship between the rotational angles of the scanning mirror and the output count values of the counter.

Figure 5:
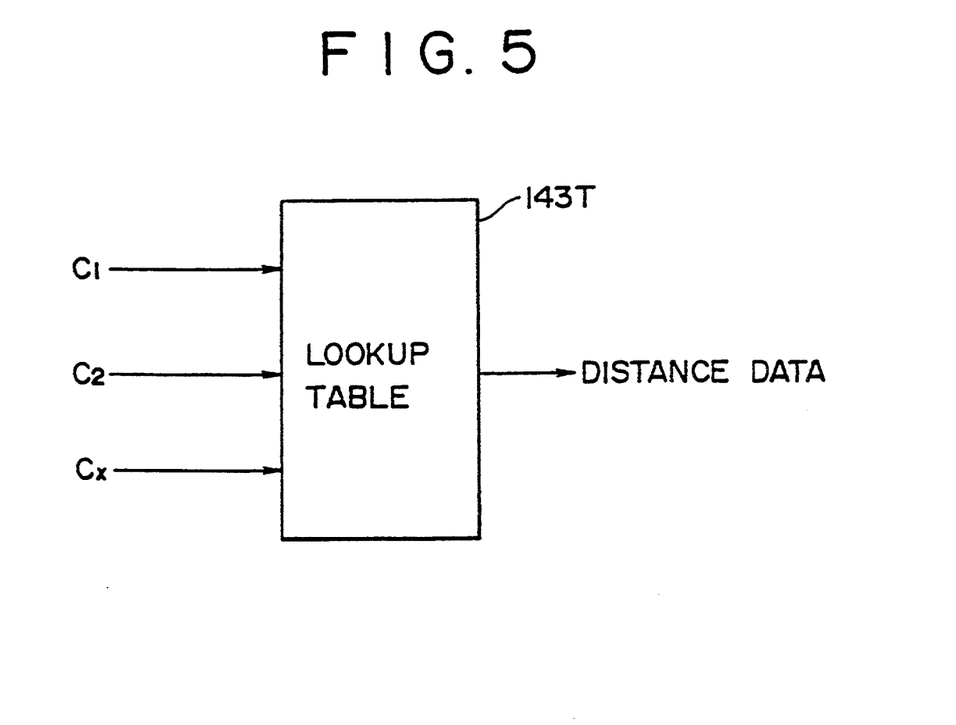
FIG. 5 is a block diagram of an exemplary lookup table usable instead of a calculator 143 in FIG. 4.

According to a fourth aspect of the invention, a distance measuring apparatus scans the surface of an object with slit light while rotating a scanning mirror, and then detects the points in time when the slight light reflected from the object passes through sensing cells arranged on an image pickup plane, thereby measuring the positions on the surface of the object. This apparatus comprises a counter (e.g., counter 12 in FIGS. 3 and 4) for outputting a count value indicative of the rotation angle of the scanning mirror; a subtracter (e.g., subtracter 142C in FIG. 4) for calculating the difference between the output count value of the counter indicative of the angle of the scanning mirror, where slit light reflected from a reference plane at a position (e.g., position S2 in FIG. 1) spaced apart by a predetermined distance from a first position is incident upon a predetermined one of the sensing cells on the image pickup plane, and the output count value of the counter indicative of the angle of the scanning mirror, where slit light reflected from the surface of the object to be measured is incident upon the sensing cell on the image pickup plane; and a lookup table (e.g., table in FIG. 5 or 6) for outputting the distance between the object and the first position in accordance with at least the output of the subtracter.

As a result of carrying out the present invention, the following advantageous effects are achievable.

In the distance measuring method of the first aspect, the distance to the object can be measured fast with high precision due to the procedure of calculating a numerical value indicative of a first angle difference between the first angle of the scanning mirror, where the slit light reflected from the reference plane at a first position is incident upon a predetermined one of the sensing cells arranged on the image pickup plane, and the second angle of the scanning mirror, where the slit light reflected from the reference plane at a second position is incident upon the sensing cell on the image pickup plane, the second position of the reference plane being spaced apart from the first position by a predetermined distance; calculating a numerical value indicative of a second angle difference between the second angle of the scanning mirror and a third angle of the scanning mirror, where the slit light reflected from the reference plane at a third position is incident upon the sensing cell on the image pickup plane, the third position of the reference plane being spaced apart from the second position by the same predetermined distance; calculating a numerical value indicative of a third angle difference between the third angle of the scanning mirror and a fourth angle of the scanning mirror, where the slit light reflected from the surface of the object to be measured is incident upon the sensing cell on the image pickup plane; and calculating the distance between the object and the first position on the basis of the three numerical values indicative of the first, second and third angle differences.

In the distance measuring method of the second aspect, the distance to the object can be measured fast with high precision due to the procedure of calculating a count value $C_1$ indicative of a first angle difference between a first angle of the scanning mirror, where the slit light reflected from a reference plane at a first position is incident upon a predetermined one of sensing cells arranged on an image pickup plane, and a second angle of the scanning mirror, where the slit light reflected from the reference plane at a second position is incident upon the sensing cell on the image pickup plane, the second position of the reference plane being spaced apart from the first position by a predetermined distance; calculating a count value $C_2$ indicative of a second angle difference between the second angle of the scanning mirror and a third angle of the scanning mirror, where the slit light reflected from the reference plane at a third position is incident upon the sensing cell on the image pickup plane, the third position of the reference plane being spaced apart from the second position thereof by the same predetermined distance; calculating a count value $C_x$ indicative of a third angle difference between the third angle of the scanning mirror and a fourth angle of the scanning mirror, where the slit light reflected from the surface of the object to be measured is incident upon the sensing cell on the image pickup plane; calculating a parameter k representing of the relationship between the rotational angle of the scanning mirror and the count value; and calculating the distance x from the first position to the object by Eq. (2).

In the distance measuring apparatus of the third aspect, the distance to the object can be measured fast with high precision due to the constitution which comprises a counter for outputting a count value indicative of the rotational angle of the scanning mirror, a first subtracter for calculating the difference between the output count value of the counter indicative of the first angle of the scanning mirror, where the slit light reflected from a reference plane at a first position is incident upon a predetermined one of the sensing cells arranged on the image pickup plane, and the output count value of the counter indicative of the second angle of the scanning mirror, where the slit light reflected from the reference plane at a second position is incident upon the sensing cell on the image pickup plane, the second position of the reference plane being spaced apart from the first position thereof by a predetermined distance; a second subtracter for calculating the difference between the output count value of the counter indicative of the second angle of the scanning mirror and the output count value of the counter indicative of a third angle of the scanning mirror, where the slit light reflected from the reference plane at a third position is incident upon the sensing cell on the image pickup plane, the third position of the reference plane being spaced apart from the second position by the same predetermined distance; a third subtracter for calculating the difference between the output count value of the counter indicative of the third angle of the scanning mirror and the output count value of the counter indicative of a fourth angle of the scanning mirror, where the slit light reflected from the surface of the object to be measured is incident upon the sensing cell on the image pickup plane; and a calculator for calculating the distance between the object and the first position on the basis of the outputs of the first, second, and third subtracters and the parameters representing the relationship between the rotational angles of the scanning mirror and the output count values of the counter.

In the distance measuring apparatus of the fourth aspect, the distance to the object can be measured fast with high precision due to the constitution which comprises a counter for outputting a count value indicative of the rotational angle of the scanning mirror; a subtracter for calculating the difference between the output count value of the counter indicative of the angle of the scanning mirror, where the slit light reflected from a reference plane at a position spaced apart by a predetermined distance from a first position is incident upon a predetermined one of the sensing cells on the image pickup plane, and the output count value of the counter indicative of the angle of the scanning mirror, where the slit light reflected from the surface of the object to be measured is incident upon the sensing cell on the image pickup plane; and a lookup table for outputting the distance between the object and the first position in accordance with at least the output of the subtracter. The above and other features and advantages of the present invention will become apparent from the following description which will be given with reference to the illustrative accompanying drawings.

DETAILED DESCRIPTION OF THE PREFERRED EMBODIMENTS

Hereinafter the present invention will be described in detail with reference to the accompanying drawings which represent preferred embodiments of the invention.

Figure 1:
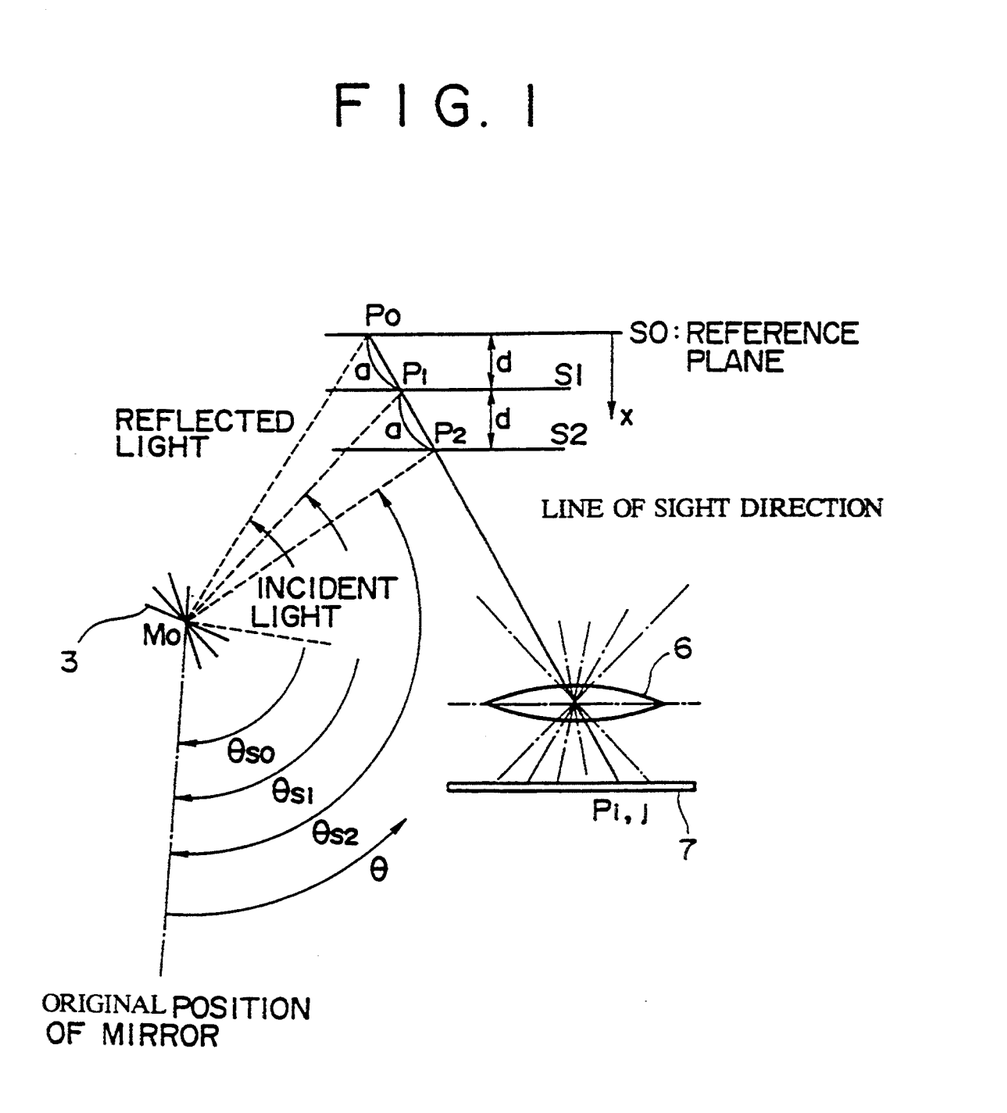
FIG. 1 is a schematic diagram for explaining the principle of operation adopted in the distance measuring method and apparatus of the present invention.
Figure 2:
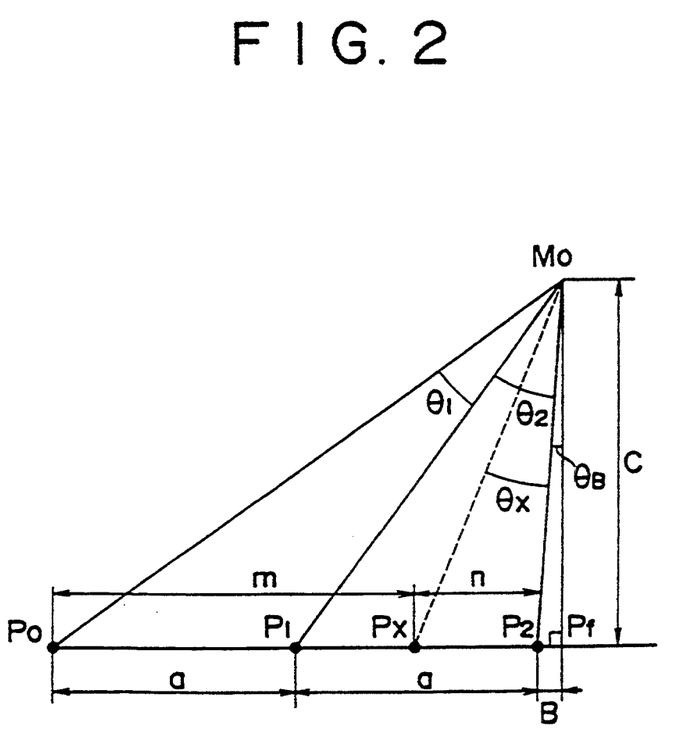
FIG. 2 shows the details of the partial geometric relationship in FIG. 1.

FIG. 1 illustrates the principle operation adopted in the distance measuring method and apparatus of the invention and FIG. 2 shows the details of the partial geometric relationship in FIG. 1. The following description will be given with regard to an exemplary case of measuring the distance from a first plane position S0 to the surface of an object to be measured. Initially, a point in time is detected when slit light reflected from a reference plane set at the first plane position S0 is incident upon (i.e., passes through) each of sensing cell arrayed on an image pickup plane 7. Next, a point in time is detected when slit light reflected from the reference plane at a second plane position S1, which is spaced apart by a predetermined distance d from the first plane position S0 and is in parallel therewith, is incident upon each sensing cell on the image pickup plane. Subsequently, another point in time is detected when slit light reflected from the reference plane at a third plane position S2, which is spaced apart the same predetermined distance d from the second plane position S1, is incident upon each sensing cell on the image pickup plane 7.

A scanning mirror 3 is rotated around a center point $M_0$ at a constant velocity, and an angle $\theta_\epsilon$ from the original position of the rotating mirror 3 is given by Eq. (3) on the basis of a counter output value $C_\epsilon$ which is reset at the original position.

$$\theta_\epsilon = k \times C_\epsilon \qquad \text{EQ. (3)}$$

(where k is a constant)

The image sensing (light receiving) cells $P_{i,j}$ are arranged two-dimensionally on the image pickup plane 7, and each cell has a specific line of sight direction dependent on an optical device 6, which may be a lens. In this example, the distance from the reference plane at the first plane position S0 is measured to a point on the surface of the object which intersects the line of sight direction of each cell.

Suppose now that $P_0$, $P_1$ and $P_2$ denote the points where the line of sight direction of one sensing cell $P_{i,j}$ on the image pickup plane 7 intersects the reference plane set at the first, second and third plane positions S0, S1 and S3. Then, the angles $\theta_{S0}$, $\theta_{S1}$ and $\theta_{S2}$ denote the angles from the original position of the scanning mirror 3 when the slit light is incident upon such points $P_0$, $P_1$ and $P_2$ respectively. Then the relationship between the distance a, the distance from point $P_0$ to $P_1$ and from point $P_1$ to $P_2$, is expressed as Eq. (4).

$$P_0P_1 = P_1P_2 = a = s \times d \qquad \text{EQ. (4)}$$

(where s is a constant)

The angle $\theta_1$ formed by segments $P_0M_0$ and $M_0P_1$, and the angle $\theta_2$ formed by segments $P_1M_0$ and $M_0P_2$ are expressed as Eqs. (5) and (6), respectively.

$$\theta_1 = \theta_{S0} - \theta_{S1} \qquad \text{EQ. (5)}$$

$$\theta_2 = \theta_{S1} - \theta_{S2} \qquad \text{EQ. (6)}$$

In the condition where a perpendicular line drawn in the line of sight direction from the rotational center $M_0$ of the scanning mirror 3 intersects the extension of the segment $P_0P_2$ at a point $P_f$, the angle $\theta_B$ is given by Eq. (7) shown below.

$$\theta_B = \angle P_2 M_0 P_f \qquad \text{EQ. (7)}$$

Supposing that $P_x$ denotes a target position on the object, which is on a straight line $P_0 P_2$ and is at a distance m from the point $P_0$, the angle $\theta_x$ is given by Eq. (8) as follows.

$$\theta_x = \angle P_2 M_0 P_x \qquad \text{EQ. (8)}$$

Then the distance x the distance to the target position $P_x$ from the reference plane at the first plane position S0, can be expressed as Eq. (9) from Eq. (4).

$$x = m/s = (2a - n)/s = 2d - n/s \qquad \text{EQ. (9)}$$

Eqs. (10), (11) and (12) represent the relationship between the length B of the segment $P_2P_f$ and the length C of the segment $M_0P_f$.

$$\tan\theta_B = \frac{B}{C} \qquad \text{EQ. (10)}$$

$$\tan(\theta_2 + \theta_B) = \frac{a + B}{C} \qquad \text{EQ. (11)}$$

$$\tan(\theta_1 + \theta_2 + \theta_B) = \frac{2a + B}{C} \qquad \text{EQ. (12)}$$

Eq. (13) is obtained from Eqs. (10), (11) and (12).

$$B = \frac{a(\tan\theta_B - \tan\theta_2\tan^2\theta_B)}{\tan\theta_2 + \tan\theta_2\tan^2\theta_B} \qquad \text{EQ. (13)}$$

$$= \frac{2a(\tan\theta_B - \tan(\theta_1 + \theta_2)\tan^2\theta_B)}{\tan(\theta_1 + \theta_2) + \tan(\theta_1 + \theta_2)\tan^2\theta_B}$$

From Eqs. (12) and (13), $\tan\theta_B$ can be expressed as Eq. (14) shown below.

$$\tan\theta_B = \frac{2\tan\theta_2 - \tan(\theta_1 + \theta_2)}{\tan\theta_2\tan(\theta_1 + \theta_2)} \qquad \text{EQ. (14)}$$

The length n from the point $P_x$ to $P_2$, and the length m from the point $P_x$ to $P_1$, can be expressed as Eqs. (15) and (16) on the basis of Eqs. (13) and (14), respectively.

$$n = C\tan(\theta_x + \theta_B) - B = \frac{a\tan\theta_x(1 - \tan\theta_2\tan\theta_B)}{\tan\theta_2(1 - \tan\theta_x\tan\theta_B)} = \qquad \text{EQ. (15)}$$

$$\frac{2a\tan\theta_x(\tan(\theta_1 + \theta_2) - \tan\theta_2)}{\tan\theta_x\tan(\theta_1 + \theta_2) - 2\tan\theta_x\tan\theta_2 + \tan\theta_2\tan(\theta_1 + \theta_2)}$$

$$m = 2a - n = \qquad \text{EQ. (16)}$$

-continued
$$\frac{2d\tan\theta_2(\tan(\theta_1 + \theta_2) - \tan\theta_x)}{\tan\theta_x\tan(\theta_1 + \theta_2) - 2\tan\theta_x\tan\theta_2 + \tan\theta_2\tan(\theta_1 + \theta_2)}$$

Accordingly, the distance x from the reference plane at the first plane position S0 to the target point $P_x$ on the surface of the object being measured is expressed as Eq. (17) on the basis of Eqs. (3), (4), (9) and (16).

$$x = \frac{2d\tan(kC_2)(\tan(kC_1 + kC_2) - \tan(kC_x))}{\tan(kC_x)\tan(kC_1 + kC_2) - 2\tan(kC_x)\tan(kC_2) + \tan(kC_2)\tan(kC_1 + kC_2)} \quad \text{EQ. (17)}$$

In Eq. (17), the count value $C_1$ indicates the angle $\theta_1$, which is the difference between the angle $\theta_{S0}$ of the scanning mirror 3, i.e., the angle at which the slit light reflected from the reference plane at the first plane position S0 is incident upon the sensing cell $P_{i,j}$ on the image pickup plane, and the angle $\theta_{S1}$ of the scanning mirror 3, the angle at which the slit light reflected from the reference plane at the second plane position S1, which is spaced apart by a predetermined distance d from the first plane position S0, is incident upon the sensing cell $P_{i,j}$ on the image pickup plane 7. The count value $C_2$ indicates the angle $\theta_2$, the difference between the angle $\theta_{S1}$ of the scanning mirror 3 and the angle $\theta_{S2}$ of the scanning mirror 3, i.e., the angle at which the slit light reflected from the reference plane at the third plane position S2, which is spaced apart from the second plane position S1 by the same distance d, is incident upon the sensing cell $P_{i,j}$ on the image pickup plane 7. Finally the count value $C_x$ indicates the angle $\theta_x$ which is the difference between the angle $\theta_{S2}$ of the scanning mirror 3 and the angle $\theta_{Sx}$ of the scanning mirror 3, the angle at which the slit light reflected from the surface of the object is incident upon the sensing cell $P_{i,j}$ on the image pickup plane 7.

The parameter k, representing the relationship between the rotational angle of the scanning mirror 3 and the count value, can be obtained from Eq. (17) under the condition where the reference plane is set at a previously known position other than the aforementioned first, second and third plane positions S0, S1 and S2.

Figure 3:
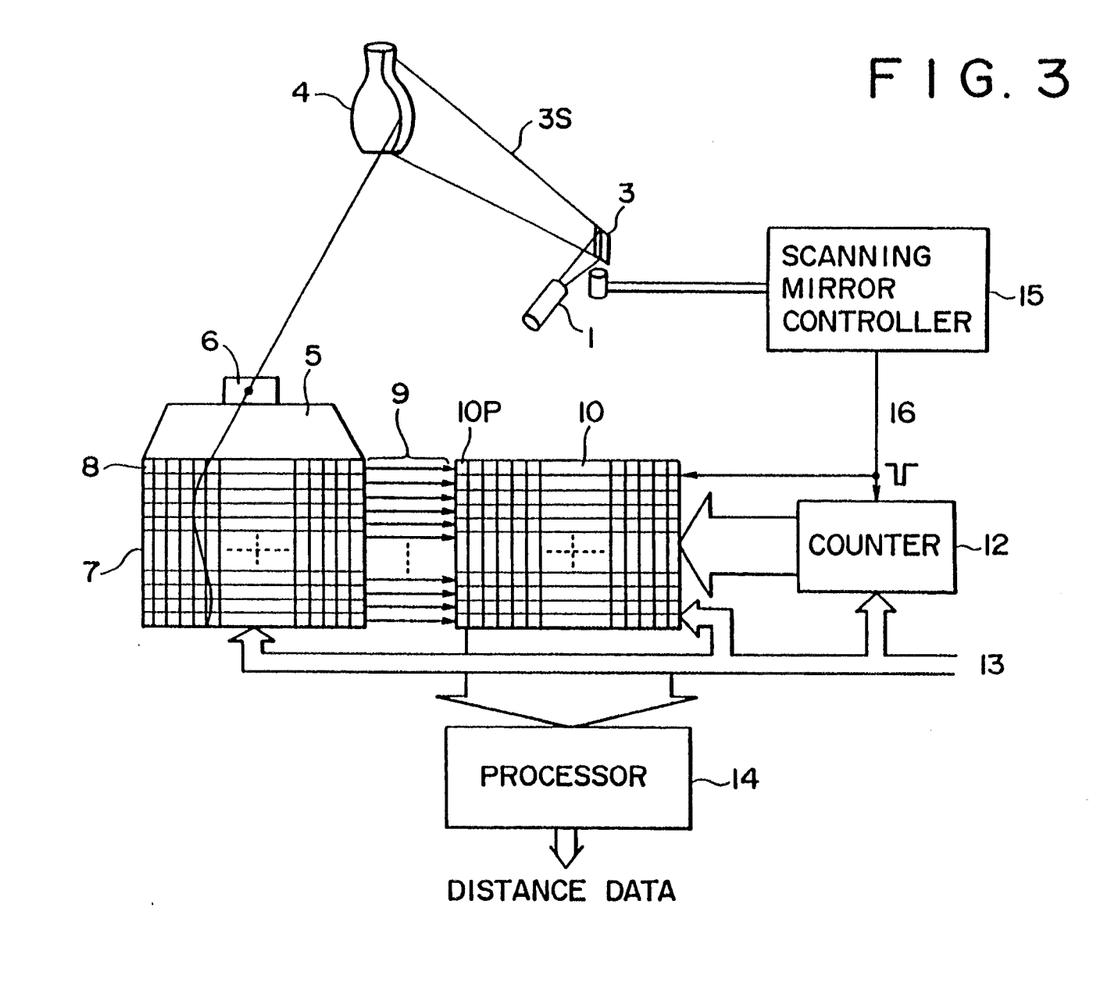
FIG. 3 is a block diagram showing the constitution of a preferred embodiment which represents the distance measuring apparatus of the invention.

FIG. 3 shows a preferred embodiment of the distance measuring apparatus according to the present invention. In this diagram, slit light 3S from the slit light generating laser 1 is reflected via a scanning mirror 3 consisting of, for example, a galvano mirror so that the slit light 3S is sequentially caused to scan a reference plane set at a second plane position S1 in FIG. 1, then a reference plane set at a third plane position S2 in FIG. 1, and finally a three-dimensional object 4 to be measured. The slit light generating laser 1 may comprise a semiconductor laser which produces an output beam of 670 nm in wavelength (10 mW at the outside of a lens, and approximately 1 mm in slit-light width). Preferably, an optical device 2 for forming the output beam of the light source 1 into a slit is also provided in the actual apparatus, but such an optical device 2 is not shown in FIG. 3 for the purpose of simplifying the illustration.

The slit light reflected sequentially from the reference plane at the first plane position S0 in FIG. 1, the reference plane at the second plane position S1 in FIG. 1, the reference plane at the third plane position S2 in FIG. 1 and the surface of the object 4 is projected successively onto an image pickup plane 7 via a lens 6 of an image sensor 5. The image pickup plane 7 may comprise a plurality of sensing cells 8 arrayed thereon two-dimensionally. Each sensing cell 8 produces an output signal when the slit light 2 has passed through the reference plane or the object 4 in the line of sight direction, i.e., when the slit light reflected from the reference plane or the object 4 has passed through the slit light itself.

The output signal of each sensing cell 8 is read by a reader 9, and a count value, from a counter 12, is stored in a memory cell 10P of a count value memory 10 which corresponds to the sensing cell 8 which output the signal. The individual operations of counting up the signals in the counter 12, outputting the signals from the sensing cells 8, and storing the count value in the memory cells 10P are performed in synchronism with an external clock signal 13 (having a frequency of about, e.g., 100 kHz).

Since the scanning mirror 3 is driven to rotate at a constant angular velocity, the output of the counter 12 corresponds to the angle data obtained from the mirror 3. A processor 14 computes the distance from the first plane position in FIG. 1 to the surface of the object on the basis of the count value stored in each memory cell 10P.

A scanning mirror controller 15 outputs a reset signal (e.g., at about 60 Hz) every scan of the mirror 3 to thereby reset the contents of the counter 12 and the count value memory 10.

Figure 4:
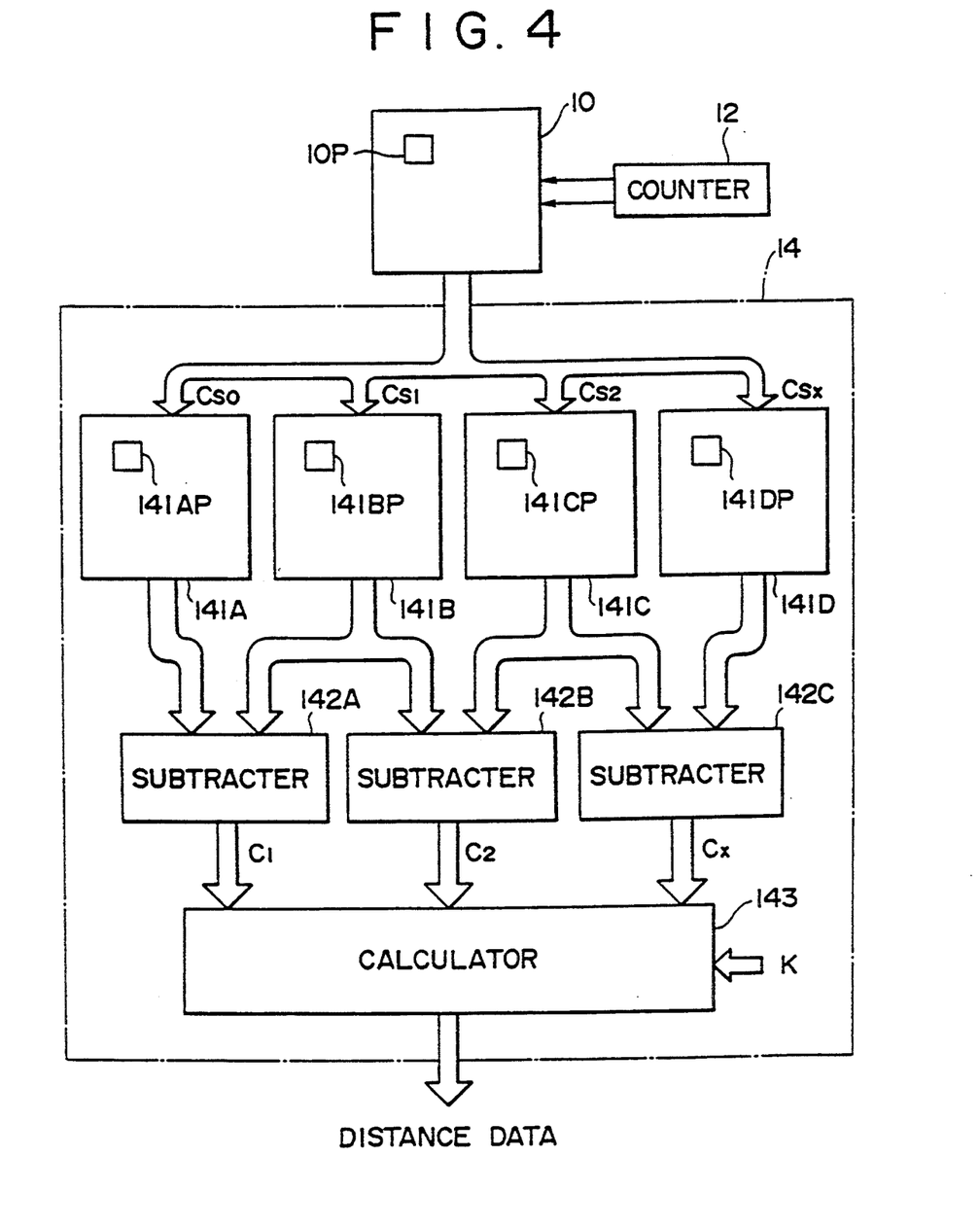
FIG. 4 is a block diagram showing an exemplary constitution of a processor 14 employed in the apparatus of FIG. 3.

FIG. 4 shows an exemplary constitution of the processor 14 in FIG. 3. A memory plane 141A comprises memory cells equal in number to the cells of the count value memory 10. Each memory cell 141AP receives, from the cell 10P of the count value memory 10, a count value $C_{S0}$ which indicates the angle $\theta_{S0}$ of the scanning mirror 3 at which the slit light reflected from the reference plane at the first plane position S0 is incident upon the cell $P_{i,j}$ on the image pickup plane 7. The count value $C_{S0}$ thus received is stored in the memory cell 141AP.

A memory plane 141B comprises of memory cells equal in number to the cells of the count value memory 10. Each memory cell 141BP receives, from the cell 10P of the count value memory 10, a count value $C_{S1}$ indicative of the angle $\theta_{S1}$ of the scanning mirror 3 at which the slit light reflected from the reference plane at the second plane position S1, which is spaced apart by a distance d from the first plane position, is incident upon the sensing cell $P_{i,j}$ on the image pickup plane 7. The count value $C_{S1}$ thus received is stored in the memory cell 141BP.

A memory plane 141C comprises memory cells equal in number to the cells of the count value memory 10. Each memory cell 141CP receives, from the cell 10P of the count value memory 10, a count value $C_{S2}$ indicative of the angle $\theta_{S2}$ of the scanning mirror 3 at which the slit light reflected from the reference plane at the second plane position S2, which is spaced apart by the same distance d from the first plane position, is incident upon the sensing cell $P_{i,j}$ on the image pickup plane 7. The count value $C_{S2}$ thus received is stored in the memory cell 141CP.

A memory plane 141D comprises memory cells equal in number to the cells of the count value memory 10. Each memory cell 141DP receives, from the cell 10P of the count value memory 10, a count value $C_{Sx}$ which indicates the angle $\theta_{Sx}$ of the scanning mirror 3 at which the slit light reflected from the surface of the object 4 is incident upon the sensing cell $P_{i,j}$ on the image pickup plane 7. The count value $C_{Sx}$ thus received is stored in the memory cell 141DP.

A subtracter 142A calculates the difference $C_1$ between the output count value $C_{S0}$ of the memory plane 141A and the output count value $C_{S1}$ of the memory plane 141B, and then supplies the difference $C_1$ to a calculator 143. A subtracter 142B calculates the difference $C_2$ between the output count value $C_{S1}$ of the memory plane 141B and the output count value $C_{S2}$ of the memory plane 141C, and supplies the difference $C_2$ to the calculator 143. A subtracter 142C calculates the difference $C_x$ between the output count value $C_{S2}$ of the memory plane 141C and the output count value $C_{Sx}$ of the memory plane 141D, and supplies the difference $C_x$ to the calculator 143.

The calculator 143 receives the parameter k together with the count values $C_1$, $C_2$ and $C_x$ from the subtracters 142A, 142B and 142C respectively and calculates the distance x by executing Eq. (17).

In the embodiment of FIG. 4, Eq. (17) is executed by the calculator 143. However, the desired distance can be obtained faster by another procedure which comprises the steps of previously calculating the possibly assumable distances x relative to the count values $C_1$, $C_2$ and $C_x$ with regard to the individual sensing cells 8 ($P_{i,j}$) on the image pickup plane 7. These pre-calculated approximate distances are then stored in the lookup table 143T shown in FIG. 5 and the distance x is output from the lookup table 143T in response to each of the count values $C_1$, $C_2$ and $C_x$ received from the subtracters 142A, 142B and 143C in FIG. 4.

Figure 6:
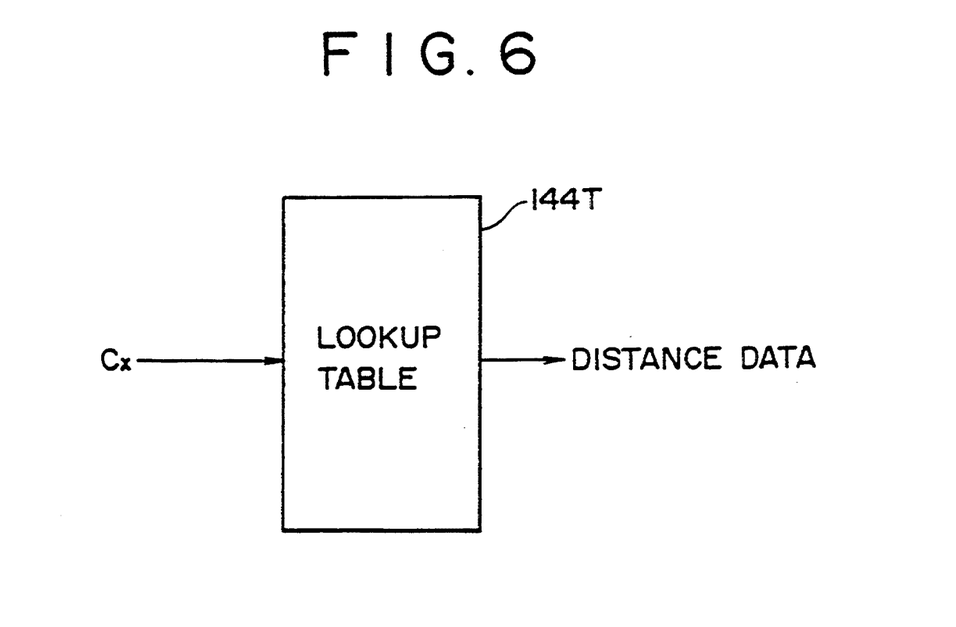
FIG. 6 is a block diagram of a modification of the lookup table in FIG. 5.

In another example where the first, second and third plane positions S0, S1 and S2 in FIG. 1 are fixed, the only variable is the count value $C_x$, so that the distance x can be obtained merely by inputting the count value $C_x$ as in the lookup table 144T of FIG. 6.

Figure 7:
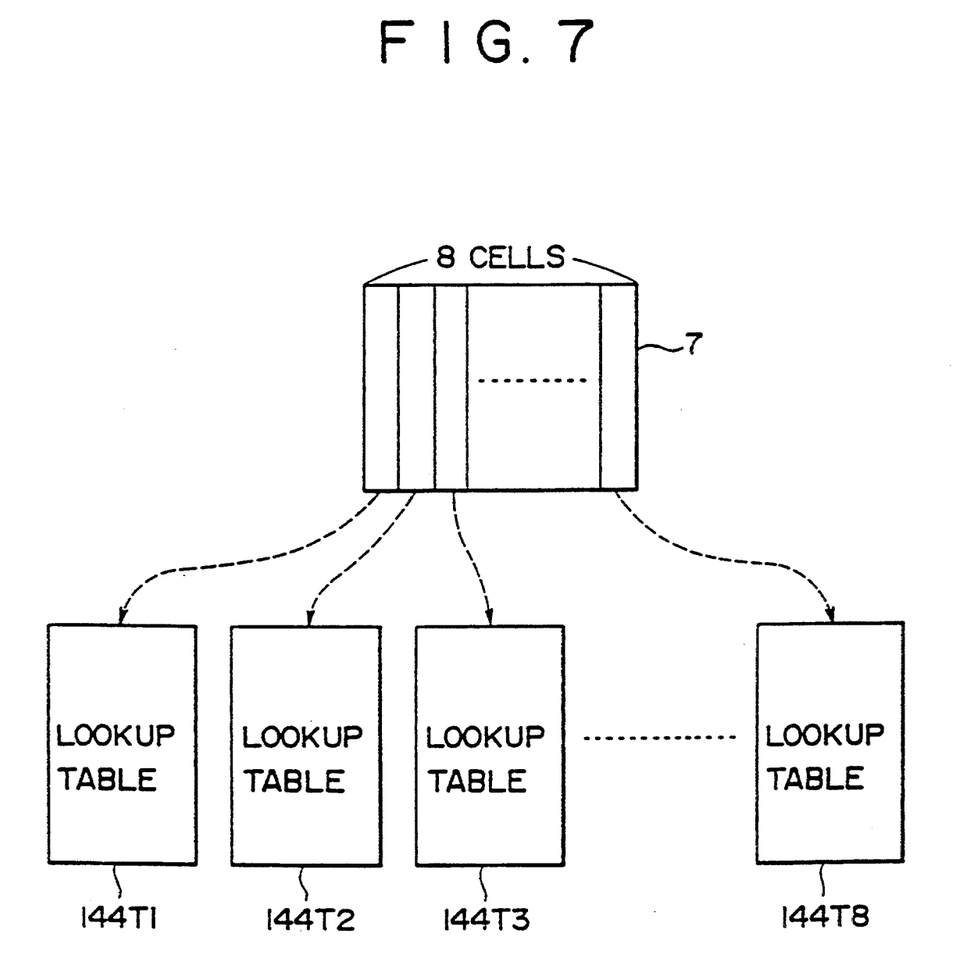
FIG. 7 shows the relationship between an image pickup plane 7 and lookup tables.

In case the first, second and third plane positions S0, S1 and S2 are determined to be parallel with the image pickup plane 7, i.e., in case each reference plane is set to be parallel with the image pickup plane 7, the same lookup table is commonly usable for a plurality of sensing cells arranged vertically on the image pickup plane 7. More specifically, when, for example, 8 sensing cells are arranged horizontally on the image pickup plane 7 as shown in FIG. 7, the desired distances may be obtained merely by preparing only 8 lookup tables 144T1, 144T2, 144T3, . . . 144T8.

Figure 8:
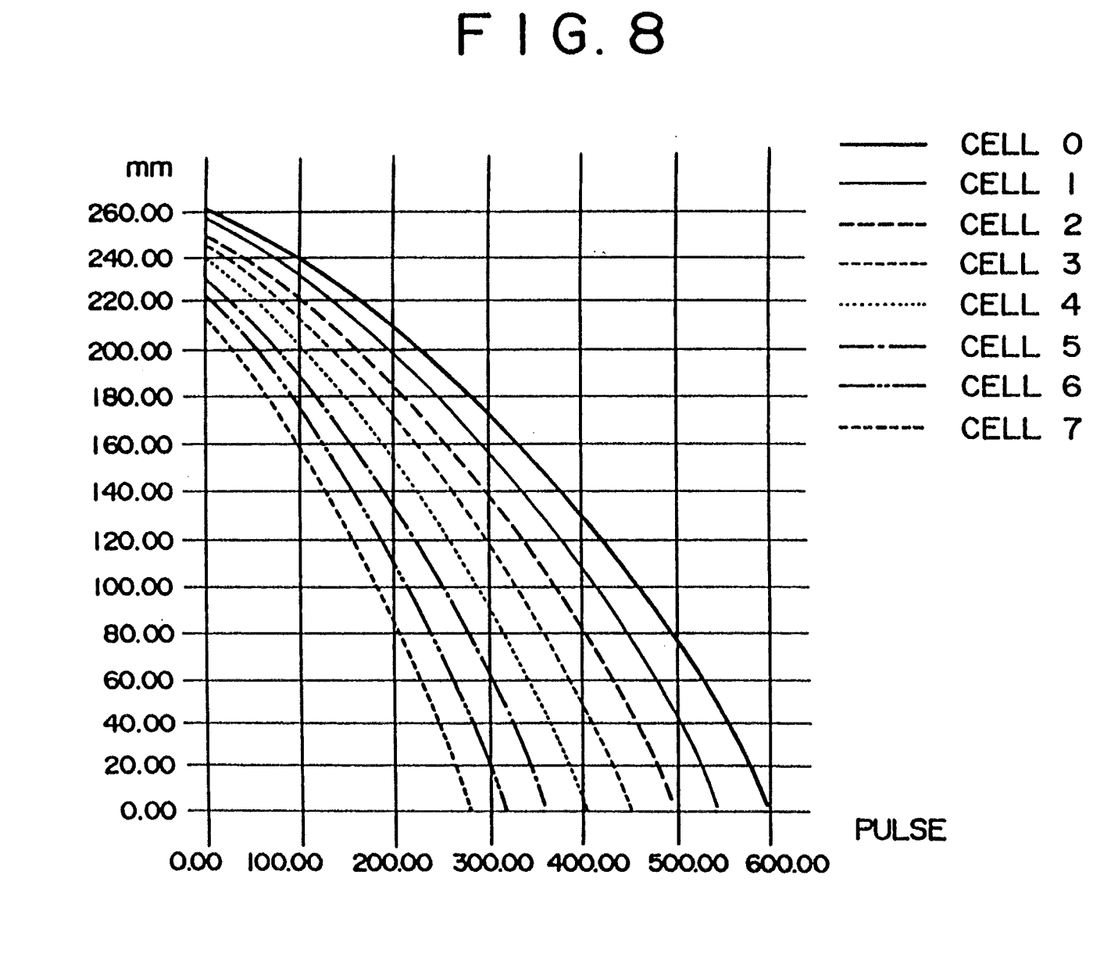
FIG. 8 graphically shows an example of storage contents in the lookup tables 144T1 to 144T8 in FIG. 7.

FIG. 8 shows exemplary contents of a lookup table prepared for converting the count values of 8 horizontal sensing cells on an 8×16 image pickup plane (consisting of 8 horizontal cells×16 vertical cells into a distance). In this example, the length is set to 90 mm, and each distance shown is from the first plane position S0 which is spaced apart by approximately 33 cm from the image pickup plane of a camera.

Figure 9:
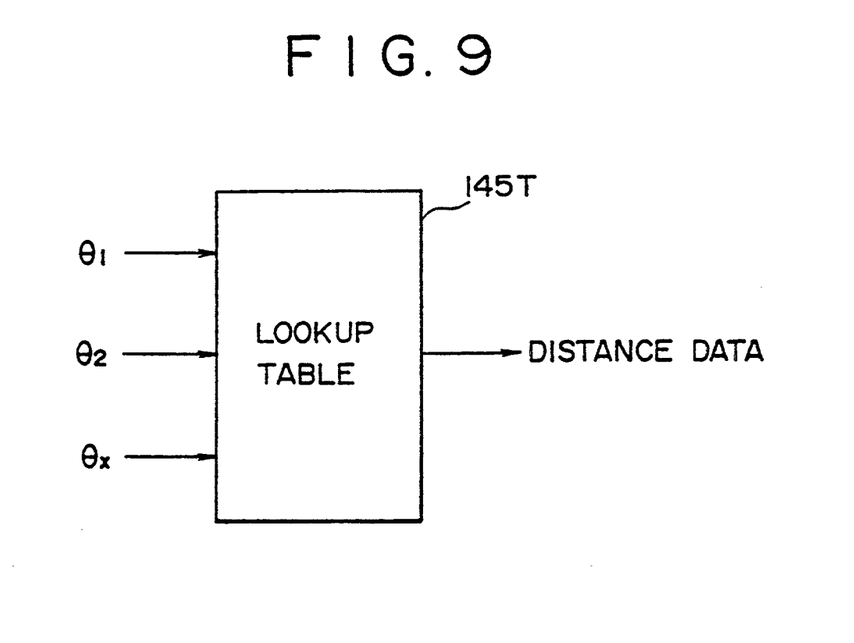
FIG. 9 is a block diagram of another modification of the lookup table in FIG. 5.

In the above embodiment, the distance x is obtained by executing the calculation of Eq. (17) in the calculator 143 of FIG. 4 on the basis of the count values $C_1$, $C_2$ and $C_x$, or by using the lookup table 143T or 144T of FIG. 5 or 6. However, it is also possible to obtain the distance x by executing the calculation of Eq. (16) on the basis of the rotation angles $\theta_1$, $\theta_2$ and $\theta_x$ of the scanning mirror 3 which correspond respectively to the count values $C_1$, $C_2$ and $C_x$, or by using the lookup table 145T where the rotation angles $\theta_1$, $\theta_2$ and $\theta_x$ are input as shown in FIG. 9, or by using another lookup table where only the rotation angle $\theta_x$ is input.

Furthermore, the distance x may be obtained by using, besides the count values $C_1$, $C_2$ and $C_x$ described above, any other value indicating the rotation angles $\theta_1$, $\theta_2$ and $\theta_x$ of the scanning mirror 3.

Figure 10:
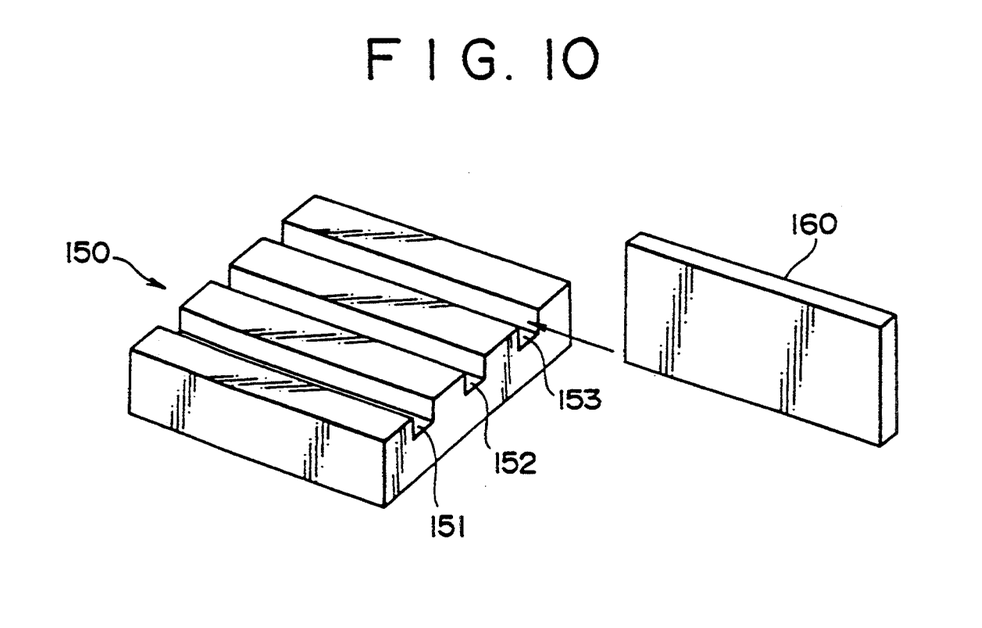
FIG. 10 is a perspective view of an exemplary position setting jig employed for positioning a reference plane.

In a practical measuring environment, setting of the reference planes at the mutually parallel and equidistant first, second and third positions S0, S1 and S2 can be achieved by providing, as illustrated in FIG. 10, a position setting jig 150 which has mutually parallel and equidistant grooves 151, 152 and 153 corresponding respectively to the first, second and third plane positions S0, S1 and S2, and then placing a reference plane plate 160 sequentially in such grooves 151, 152 and 153.

In the above embodiment, the parameter k is calculated according to Eq. (17) under the condition where the reference plane is set at a previously known plane position other than the first, second and third plane positions S0, S1 and S2. However, it is also possible to obtain such parameter k by the technique of retrieval.

In addition to the above embodiment where the distance to the object is measured by sequentially setting the reference planes at the mutually parallel and equidistant first, second and third plane positions S0, S1 and S2, the distance measurement can also be performed also by setting the reference plane at four or more plane positions which are mutually parallel and equidistant.

A further alternative from the embodiment where each three-dimensional coordinate position on the surface of the object is calculated with reference to the first plane position S0, is obtaining the three-dimensional coordinate position on the object surface with reference to the position of the distance measuring apparatus by previously finding the positional relationship between the first plane position and the distance measuring apparatus.

We claim:

1. A method for measuring distances to positions on a surface of a three-dimensional object using slit light directed by a rotating scanning mirror, and sensing cells arranged on an image pickup plane, said method comprising the steps of:

calculating a numerical value indicative of a first difference between a first angle of said scanning mirror at which the slit light reflected from a reference plane at a first position is incident upon a predetermined one of the sensing cells, and a second angle of said scanning mirror at which slit light reflected from the reference plane at a second position is incident upon said one sensing cell, said second position of the reference plane being spaced apart from said first plane by a predetermined distance;

calculating a numerical value indicative of a second difference between the second angle of said scanning mirror and a third angle of said scanning mirror at which the slit light reflected from the reference plane at a third position is incident upon said one sensing cell, said third position of the reference plane being spaced apart from said second position by said predetermined distance;

calculating a numerical value indicative of a third difference between the third angle of said scanning mirror and a fourth angle of said scanning mirror at which the slit light reflected from the surface of the object to be measured is incident upon said one sensing cell; and calculating the distance between said object and said first position on the basis of the numerical values indicative of said first, second and third differences.

2. The distance measuring method as set forth in claim 1, wherein said step of calculating said distance between said object and said first position comprises the step of using a lookup table. fourth count value of said count means indicative of a fourth angle of said scanning mirror, where slit light reflected from the surface of said object to be measured is incident upon said one sensing cell on the image pickup plane; and calculation means for calculating the distance between said object and said first position by using outputs of said first, second and third subtraction means, and a parameter representing the relationship between the rotational angle of said scanning mirror and an output count value of said count means.

3. The distance measuring method as set forth in claim 1, wherein said distance between said object and said first position is calculated a plurality of times as said scanning mirror is rotated, whereby an external shape of said object may be determined.

4. A method for measuring distances to positions on a surface of a three-dimensional object using slit light directed by a rotating scanning mirror, and sensing cells arranged on an image pickup plane, said method comprising the steps of:

calculating a count value $C_1$ indicative of a first difference between a first angle of said scanning mirror at which the slit light reflected from a reference plane at a first position is incident upon a predetermined one of the sensing cells, and a second angle of said scanning mirror at which the slit light reflected from the reference plane at a second position is incident upon said one sensing cell, said second position of the reference plane being spaced apart from said first position by a predetermined distance;

calculating a count value $C_2$ indicative of a second difference between the second angle of said scanning mirror and a third angle of said scanning mirror at which the slit light reflected from the reference plane at a third position is incident upon said one sensing cell, said third position of the reference plane being spaced apart from said second position by said predetermined distance;

calculating a count value $C_x$ indicative of a third difference between the third angle of said scanning mirror and a fourth angle of said scanning mirror at which the slit light reflected from the surface of said object to be measured is incident upon said one sensing cell;

calculating a parameter k representative of a relationship between a rotational angle of said scanning mirror and a count value; and calculating a distance x between said first position and said object from the following equation:

$$x = \frac{2d\tan(kC_2)(\tan(kC_1 + kC_2) - \tan(kC_x))}{\tan(kC_x)\tan(kC_1 + kC_2) - 2\tan(kC_x)\tan(kC_2) + \tan(kC_2)\tan(kC_1 + kC_2)};$$

where d is said predetermined distance.

5. An apparatus for measuring distances to positions on a surface of a three-dimensional object, comprising:

a plurality of sensing cells arranged on an image pickup plane;

a scanning mirror arranged to reflect incident light as slit light towards a reference plane;

means for rotating said scanning mirror to thereby change an angle at which said incident light is reflected;

a count means for outputting a count value indicative of the rotational angle of said scanning mirror;

a first subtraction means for calculating the difference between a first count value of said count means indicative of a first angle of said scanning mirror at which the slit light reflected from said reference plane at a first position thereof is incident upon a predetermined one of said sensing cells, and a second count value of said count means indicative of a second angle of said scanning mirror at which the slit light reflected from the reference plane at a second position thereof is incident upon said sensing cell, said second position of the reference plane being spaced apart from said first position by a predetermined distance;

a second subtraction means for calculating the difference between the second count value of said count means indicative of the second angle of said scanning mirror and a third count value of said count means indicative of a third angle of said scanning mirror at which the slit light reflected from the reference plane at a third position thereof is incident upon said sensing cell, said third position of the image pickup plane being spaced apart from said second position by said predetermined distance;

a third subtraction means for calculating the difference between the third count value of said count means indicative of the third angle of said scanning mirror and a fourth count value of said count means indicative of a fourth angle of said scanning mirror at which the slit light reflected from the surface of said object to be measured is incident upon said sensing cell; and calculation means for calculating the distance between said object and said first position by using the difference calculations of said first, second and third subtraction means, and a parameter representative of the relationship between the rotational angle of said scanning mirror and the output count value of said count means.

6. The distance measuring apparatus as set forth in claim 5, wherein said calculation means comprises a lookup table.

7. The distance measuring apparatus as set forth in claim 5, wherein said calculation means is operable to calculate the distance between said object and said first position a plurality of times as said scanning mirror is rotated whereby an external shape of said object may be determined.

8. An apparatus for measuring distances to positions on a surface of a three-dimensional object, comprising:

a plurality of sensing cells arranged on an image pickup plane;

a scanning mirror arranged to reflect incident light as slit light toward a reference plane;

means for rotating said scanning mirror to thereby change the angle at which said incident light is reflected;

a count means for outputting a count value indicative of a rotational angle of said scanning mirror;

a subtraction means for calculating the difference between a first output count value of said count means indicative of a first angle of said scanning mirror at which the slit light, reflected from a reference plane which is spaced apart by a predetermined distance from a first plane position, is incident upon a predetermined one of said sensing cells, and a second output count value of said count means, indicative of a second angle of said scanning mirror at which the slit light reflected from the surface of said object to be measured is incident upon said sensing cell; and a lookup table for outputting the distance between said object and said first position in accordance with said difference output from said subtraction means.

9. The distance measuring apparatus as set forth in claim 8, wherein said calculation means is operable to calculate the distance between said object and said first position a plurality of times as said scanning mirror is rotated whereby an external shape of said object may be determined.

* * * * *